(12) United States Patent
Yang et al.

(10) Patent No.: US 11,029,764 B2
(45) Date of Patent: Jun. 8, 2021

(54) OPTICAL DETECTION DEVICE AND RELATED TURNTABLE WATCH

(71) Applicant: PixArt Imaging Inc., Hsin-Chu (TW)

(72) Inventors: Chung-Ting Yang, Hsin-Chu (TW); Kai-Ho Tsai, Hsin-Chu (TW); Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/431,700

(22) Filed: Jun. 4, 2019

(65) Prior Publication Data
US 2019/0377426 A1 Dec. 12, 2019

(30) Foreign Application Priority Data

Jun. 12, 2018 (TW) .................................. 107120213
Nov. 30, 2018 (TW) .................................. 107143028

(51) Int. Cl.
| | |
|---|---|
| *G06F 3/03* | (2006.01) |
| *G01D 5/32* | (2006.01) |
| *G06F 3/042* | (2006.01) |
| *G01D 18/00* | (2006.01) |
| *G04F 3/06* | (2006.01) |

(52) U.S. Cl.
CPC ............. *G06F 3/0304* (2013.01); *G01D 5/32* (2013.01); *G01D 18/00* (2013.01); *G04F 3/06* (2013.01); *G06F 3/0421* (2013.01)

(58) Field of Classification Search
CPC .... G06F 3/0304; G06F 3/0421; G06F 3/0312; G04F 3/06; G01D 18/00; G01D 5/32; G01D 5/30; G04D 7/004; G01V 8/22; G04B 37/0008; G04B 19/042; G04B 19/04; G02B 17/00; G01B 11/14; G01B 11/00; G04C 3/00; G04C 3/14; G04C 17/00

See application file for complete search history.

(56) References Cited

U.S. PATENT DOCUMENTS

| | | | | |
|---|---|---|---|---|
| 5,270,993 A * | 12/1993 | Besson | ..................... | G04C 3/14 368/80 |
| 6,575,618 B1 * | 6/2003 | Inoue | ................... | G01D 5/2451 250/231.13 |
| 9,904,252 B2 * | 2/2018 | Kato | ...................... | G04R 20/08 |
| 2009/0296533 A1 * | 12/2009 | Kojima | ..................... | G04C 3/14 368/185 |
| 2013/0010576 A1 * | 1/2013 | Fung | ....................... | G04C 17/00 368/11 |

(Continued)

*Primary Examiner* — Bryan Earles
(74) *Attorney, Agent, or Firm* — Winston Hsu

(57) ABSTRACT

An optical detection device capable of detecting a pointer position of a turntable watch includes an optical receiver and a processor. The optical receiver is disposed inside the turntable watch and adapted to receive an optical reflecting signal. The processor is electrically connected to the optical receiver and adapted to compare a physical quantity of the optical reflecting signal with a predefined condition for determining whether a pointer of the turntable watch is located above the optical receiver. The optical detection device further includes an optical emitter electrically connected to the processor and adapted to emit an optical detecting signal. The optical detecting signal is projected onto the pointer to generate the optical reflecting signal.

27 Claims, 5 Drawing Sheets

(56) References Cited

U.S. PATENT DOCUMENTS

| | | | |
|---|---|---|---|
| 2014/0014839 A1* | 1/2014 | Chang | G06F 1/1684 250/338.4 |
| 2015/0116730 A1* | 4/2015 | Tortora | G04B 19/042 356/614 |
| 2016/0109861 A1* | 4/2016 | Kim | G04G 17/04 368/69 |

* cited by examiner

OPTICAL DETECTION DEVICE AND RELATED TURNTABLE WATCH

BACKGROUND OF THE INVENTION

1. Field of the Invention

The present invention relates to an optical detection device and a related turntable watch, and more particularly, to an optical detection device of detecting a pointer position of a turntable watch and the related turntable watch.

2. Description of the Prior Art

A turntable watch can include a motor to drive pointers, such as an hour hand, a minute hand and a second hand, for indicating time. The pointers may be reset to execute calibration when the turntable watch is operated for a while. In a conventional calibrating method, the user may watch an indication result of a clock to manually turn the pointers for calibrating its position. Thus, design of an optical detection device capable of automatically calibrating the pointers of the turntable watch according to standard time is an important issue in the watch industry.

SUMMARY OF THE INVENTION

The present invention provides an optical detection device of detecting a pointer position of a turntable watch and the related turntable watch for solving above drawbacks.

According to the claimed invention, an optical detection device of detecting a pointer position of a turntable watch is disclosed. The optical detection device includes an optical receiver and a processor. The optical receiver is disposed inside the turntable watch and adapted to receive an optical reflecting signal. The processor is electrically connected to the optical receiver and adapted to compare a physical quantity of the optical reflecting signal with a predefined condition for determining whether a pointer of the turntable watch is located above the optical receiver. The optical detection device further includes an optical emitter electrically connected to the processor and adapted to emit an optical detecting signal. The optical detecting signal is projected onto the pointer to generate the optical reflecting signal.

According to the claimed invention, the processor is electrically connected to a motor and a time receiver of the turntable watch, the processor is used to drive the motor to calibrate the pointer in accordance with a comparison result of the physical quantity and a time signal received by the time receiver. The optical detection device further includes a memory electrically connected to the processor and used to store a predefined threshold. The processor compares the physical quantity with the predefined threshold to determine whether the physical quantity conforms to the predetermined condition. The predefined condition is represented as the physical quantity greater than the predefined threshold in response to the pointer coated by high reflectivity material. The predefined condition is represented as the physical quantity smaller than or equal to the predefined threshold in response to the pointer coated by low reflectivity material.

According to the claimed invention, the physical quantity is illumination of the optical reflecting signal, and the illumination is computed according to intensity values detected by total pixels or some of the pixels of the optical receiver. The processor sets a first acquired result from a plurality of comparison results as a reference for calibrating the pointer when acquiring the plurality of comparison results conforming to the predefined condition.

According to the claimed invention, the turntable watch has a first pointer and a second pointer, the processor compares the physical quantity with a first predefined condition and a second predefined condition to determine the optical reflecting signal belonging to the first pointer or the second pointer. The first predefined condition and the second predefined condition are intensity range or a remaining period of specific intensity. The processor is electrically connected to a motor of the turntable watch, and used to respectively or simultaneously depart the first pointer and the second pointer from a position located above the optical receiver via the motor for initialization. The optical receiver is exposed via a hole formed on a holder of the turntable watch, or is disposed under a light penetrating unit filled inside the hole of the holder.

According to the claimed invention, the optical detection device includes an optical emitter, an optical receiver and a processor. The optical emitter is adapted to emit an optical detecting signal. The optical receiver is disposed inside the turntable watch and adapted to receive an optical reflecting signal. The optical detecting signal is projected onto the pointer to generate the optical reflecting signal. The processor is electrically connected to the optical emitter and the optical receiver, and adapted to analyze variation in physical quantity of several optical reflecting signals respectively received at different time for identifying the optical reflecting signals are aborted or used to determine the pointer is located above the optical receiver.

According to the claimed invention, the processor turns off the optical emitter to acquire a first optical reflecting signal and then turns on the optical emitter to acquire a second optical reflecting, and analyzes difference between the physical quantity of the first optical reflecting signal and the second optical reflecting signal for deciding whether an identifying result of the pointer is affected by ambient illumination. The identifying result is affected by the ambient illumination when the physical quantity difference is smaller than or equal to a predefined value, and the identifying result is not affected by the ambient illumination when the physical quantity difference is greater than the predefined value.

According to the claimed invention, the processor is electrically connected a motor of the turntable watch, the processor shifts the pointer forward and backward via the motor to respectively acquire a first optical reflecting signal and a second optical reflecting signal, and analyzes physical quantity of the first optical reflecting signal and the second optical reflecting signal to identify the optical reflecting signals are aborted or useful. The first optical reflecting signal and the second optical reflecting signal are aborted when at least one of the physical quantity of the first optical reflecting signal and the second optical reflecting signal does not conform to a predefined condition. The predefined condition is represented as the physical quantity greater than or smaller than a predefined threshold in response to a coefficient of reflectivity material coated on the pointer.

According to the claimed invention, time difference between the first optical reflecting signal and the second optical reflecting signal is a predefined value stored in a memory of the optical detection device. The processor counts a remaining period of the physical quantity conforming to a predetermined condition, and analyzes the remaining period to identify whether the optical reflecting signals are aborted or useful. The processor determines the optical reflecting signals are aborted when the remaining period is greater than a predefined period stored in a memory of the optical detection device.

According to the claimed invention, a turntable watch includes a casing, a covering component and an optical detection device. A pointer and a holder are disposed inside the casing. The pointer is movably disposed on the holder. The covering component is disposed on the casing and adapted to cover the pointer. The covering component includes a transparent body and a light rejecting layer. The light rejecting layer is disposed on a first surface of the transparent body to face the outside of the casing for rejecting an ambient optical signal with a specific wavelength. The optical detection device includes an optical emitter, an optical receiver and a processor. The optical emitter is adapted to emit an optical detecting signal with the specific wavelength. The optical receiver is disposed under the holder and adapted to receive an optical reflecting signal. The optical detecting signal is projected onto the pointer to generate the optical reflecting signal. The processor is electrically connected to the optical receiver, and adapted to analyze the optical reflecting signal for determining whether the pointer is located above the optical receiver. The covering component further includes alight absorbing layer disposed on a second surface of the transparent body opposite to the first surface, and adapted to absorb the optical detecting signal and the optical reflecting signal with the specific wavelength.

The optical detection device of the present invention can be suitable for any kind of the turntable watch without altering inner mechanical structure of the turntable watch. The optical detection device can be disposed on one surface of the casing, and a thickness of the turntable watch can be decreased accordingly. The holder inside the casing can be made by transparent material or bore the hole for allowing passing of the optical detecting signal and the optical reflecting signal, so that the turntable watch can provide preferred artistic appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
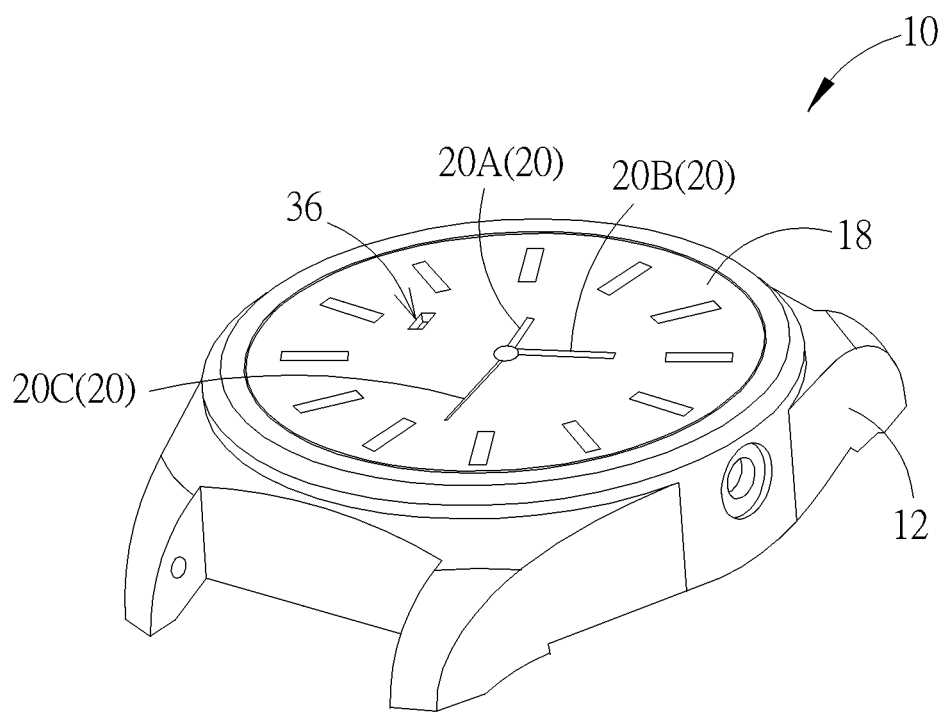
FIG. 1 is an assembly diagram of a turntable watch according to an embodiment of the present invention.
Figure 2:
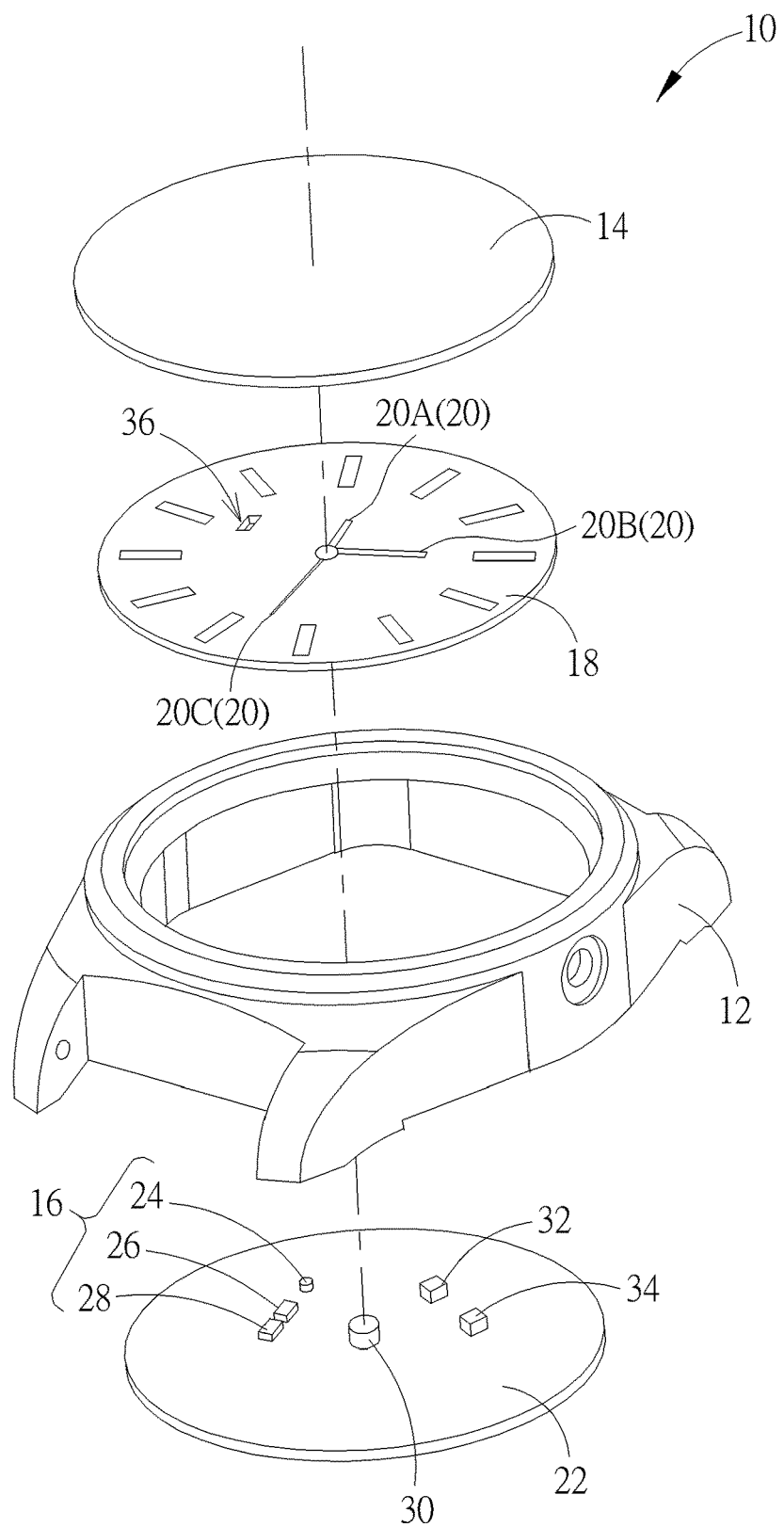
FIG. 2 is an exploded diagram of the turntable watch according to the embodiment of the present invention.
Figure 3:
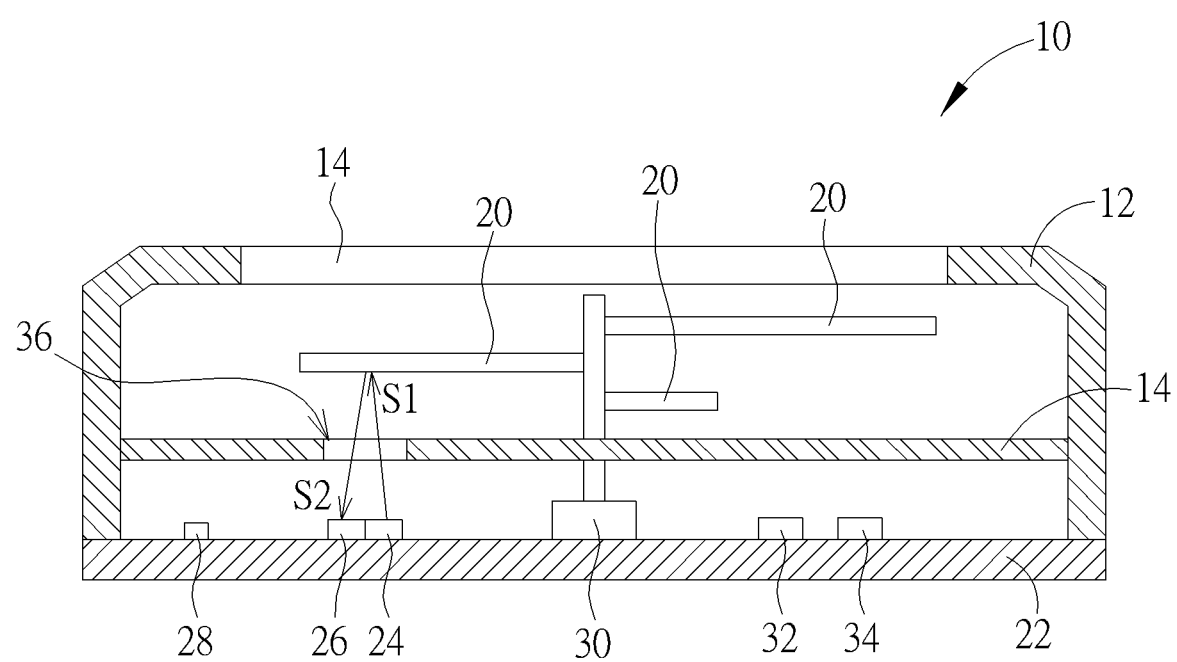
FIG. 3 is a section view of the turntable watch according to the embodiment of the present invention.

Please refer to FIG. 1 to FIG. 3. FIG. 1 is an assembly diagram of a turntable watch 10 according to an embodiment of the present invention. FIG. 2 is an exploded diagram of the turntable watch 10 according to the embodiment of the present invention. FIG. 3 is a section view of the turntable watch 10 according to the embodiment of the present invention. The turntable watch 10 can include a casing 12, a covering component 14 and an optical detection device 16.

The casing 12 can accommodate a holder 18 and a plurality of pointers 20. The plurality of pointers 20 can be movably disposed on the holder 18. The covering component 14 can be disposed on the casing 12 to cover the pointers 20 for protection. The optical detection device 16 can be disposed on a substrate 22 inside the casing 12 and have a function of detecting position of the pointers 20. The substrate 22 may be a built-in circuit board of the turntable watch 10.

The optical detection device 16 can include an optical emitter 24, an optical receiver 26 and a processor 28. The optical emitter 24 is an optional unit electrically connected to the processor 28. The optical emitter 24 can emit an optical detecting signal S1 toward the pointers 20. The optical detecting signal S1 can be projected onto the pointers 20 to generate an optical reflecting signal S2, which can be received by the optical receiver 26. The processor 28 can be electrically connected to the optical receiver 26 and compare a physical quantity of the optical reflecting signal S2 with a predefined condition, for determining whether the pointers 20 of the turntable watch 10 is located above the optical receiver 26.

The optical detection device 16 may further include a motor 30, a time receiver 32 and a memory 34. The time receiver 32 can receive a time signal via radio wave. The motor 30 can be electrically connected to the pointers 20 and the processor 28, and used to rotate the pointers 20. When the time signal is received, the processor 28 can analyze whether the time signal conforms to current time indicated by the pointers 20. The pointers 20 can include an hour hand 20A, a minute hand 20B and a second hand 20C. The turntable watch 10 can drive each hand of the pointers 20 to turn one round, so as to analyze a rotary angle of the pointer 20 when the pointer 20 is rotated from an initial position to another position detected by the optical detection device 16, for acquiring the current time. If the current time does not conform to the time signal, the processor 28 can drive the motor 30 to calibrate the pointers 20 in accordance with a comparison result of the physical quantity.

The memory 34 can be electrically connected to the processor 28 and adapted to store a predefined threshold. A value of the predefined threshold can be set according to a material property of the pointers 20 and an imaging efficiency of the optical receiver 26, which depends on design demand, and a detailed description is omitted herein for simplicity. The processor 28 can compare the physical quantity with the predefined threshold for determining whether the physical quantity conforms to the predetermined condition. It should be mentioned that the physical quantity can be illumination or other parameters of the optical reflecting signal S2; and the illumination can be computed according to intensity values by total pixels or some of the all pixels of the optical receiver 26.

In one situation, the pointers 20 are coated by high reflectivity material, so that the physical quantity can be the intensity value, and the predefined condition can be represented as the physical quantity greater than the predefined threshold. For example, the predefined threshold may be set as a grey level 100. If one pointer 20 is located above the optical receiver 26, the optical reflecting signal S2 may have high physical quantity (such as a grey level 130) due to the high reflectivity material of the pointer 20; the optical reflecting signal S2 conforms to the predefined condition because its high physical quantity is greater than the predefined threshold. If the pointer 20 is not located above the optical receiver 26, the optical reflecting signal S2 received by the optical receiver 26 is not reflected from the pointer 20 and therefore has low physical quantity (such as a grey level 70); the optical reflecting signal S2 does not conform to the predefined condition because its low physical quantity is smaller than the predefined threshold.

In another situation, the pointers 20 are coated by low reflectivity material, and the predefined condition can be represented as the physical quantity smaller than or equal to the predefined threshold. For example, the predefined threshold may be set as a grey level 50. If one pointer 20 is not located above the optical receiver 26, the optical reflecting signal S2 received by the optical receiver 26 is not reflected from the pointer 20 and may have the physical quantity as the grey level 70; the optical reflecting signal S2 does not conform to the predefined condition because the physical quantity is greater than the predefined threshold. If the pointer 20 is located above the optical receiver 26, the optical reflecting signal S2 is degraded due to the low reflectivity material of the pointer 20 and may have another low physical quantity (such as a grey level 30); the optical reflecting signal S2 conforms to the predefined condition because its low physical quantity is smaller than the predefined threshold.

Figure 4:
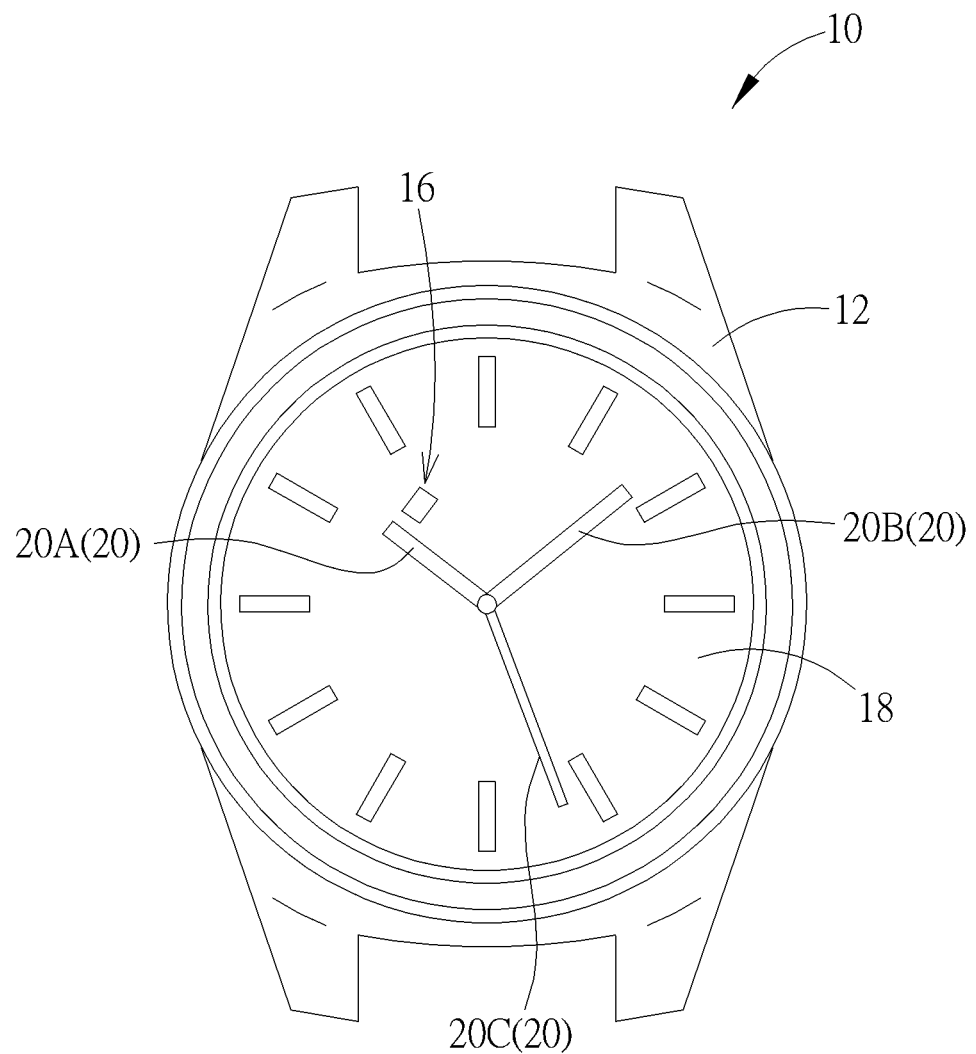
FIG. 4 is a diagram of the turntable watch in another view according to the embodiment of the present invention.

Please refer to FIG. 4. FIG. 4 is a diagram of the turntable watch 10 in another view according to the embodiment of the present invention. When the pointer 20 is rotated and detected by the optical detection device 16, the optical receiver 26 can receive a sequence of the optical reflecting signals S2 because the pointer 20 is gradually moved across the optical detection device 16. The processor 28 can compare the physical quantity of all the optical reflecting signals S2 with the predefined condition, and then acquire a plurality of comparison results conforming to the predefined condition. Generally, the processor 28 can set a first acquired result from the plurality of comparison results as a reference for calibrating the pointer 20, which means the processor 28 can calibrate position of the pointers 20 via the time signal from the time receiver 32 instantly when each pointer 20 is just moved above the optical detection device 16. Ina possible embodiment, the processor 28 may set another acquired result from the plurality of comparison results as the reference, which depends on design demand.

As mentioned above, the pointers 20 can at least include a first pointer (such as the hour hand 20A) and a second pointer (such as the minute hand 20B). The secondhand 20C can be an optional component. When the optical detection device 16 detects one optical reflecting signal S2, the processor 28 can compare the physical quantity of the detected optical reflecting signal S2 with a first predefined condition and a second predefined condition, and determine the optical reflecting signal S2 belongs to the first pointer 20A or the second pointer 20B in accordance with a comparison result. The first predefined condition and the second predefined condition can be intensity range or a remaining period of specific intensity.

In a possible embodiment, the first pointer 20A and the second pointer 20B can be coated by material having different reflectivity; for example, the first pointer 20A may be coated by metal material, and the second pointer 20B may be coated by nonmetal material. Thus, the first predefined condition can be the intensity range between grey level 200~230, and the second predefined condition can be the intensity range between grey level 100~130. The processor 28 can decide the optical reflecting signal S2 belongs to the first pointer 20A when the physical quantity is ranged between the grey level 200~230, or decide the optical reflecting signal S2 belongs to the second pointer 20B when the physical quantity is ranged between the grey level 100~130, or decide the optical reflecting signal S2 does not belong to the pointers 20 when the physical quantity is not ranged inside the grey level 200~230 and the grey level 100~130.

In another possible embodiment, the first pointer 20A and the second pointer 20B can be coated by the same material but have different structural widths; for example, a width of the first pointer 20A may be wider than a width of the second pointer 20B. The optical detection device 16 can acquire the optical reflecting signal S2 having specific intensity when the pointer 20 is moved above the optical receiver 26. If the processor 28 acquires the optical reflecting signal S2 having the specific intensity kept in the long remaining period, the first pointer 20A can be determined as being moved across the optical detection device 16. If the processor 28 acquires the optical reflecting signal S2 having the specific intensity kept in the short remaining period, the second pointer 20B can be determined as being moved across the optical detection device 16.

In a particular situation, the first pointer 20A and the second pointer 20B may be both located above the optical detection device 16, and therefore the processor 28 cannot identify how many pointers 20 are above the optical detection device 16 via one optical reflecting signal S2. For providing a solution about above-mentioned situation, the processor 28 can drive the motor 30 to respectively or simultaneously depart the first pointer 20A and the second pointer 20B from its original position. If one of the first pointer 20A and the second pointer 20B is departed and the physical quantity of the optical reflecting signal S2 is not changed, the first pointer 20A and the second pointer 20B are overlapped. If one of the first pointer 20A and the second pointer 20B is departed and the physical quantity of the optical reflecting signal S2 is changed immediately, the first pointer 20A and the second pointer 20B are not overlapped.

The holder 18 may be made by opaque material, and can have a hole 36 aligning with the optical detection device 16. The optical detecting signal S1 can pass through the hole 36 for projecting onto the pointers 20, and the optical reflecting signal S2 can pass through the hole 36 to be received by the optical receiver 26. The hole 36 can be a hollow structure, which means the optical receiver 26 is exposed via the hole 36; or the hole 36 can be filled by a light penetrating unit, which is not shown in the figures. The light penetrating unit may be made by glass or rubber.

The optical detection device 16 may be preferably actuated when the turntable watch 10 is in an environment without over-bright ambient illumination. The processor 28 can analyze variation in physical quantity of several optical reflecting signals S2 respectively received at different time, for identifying the optical reflecting signals S2 are aborted due to the over-bright ambient illumination, or can be used to determine the pointers 20 are located above the optical receiver 26. The processor 28 can turn off the optical emitter 24 to acquire a first optical reflecting signal S2 and then turns on the optical emitter 24 to acquire a second optical reflecting S2. If difference between the physical quantity of the first optical reflecting signal S2 and the second optical reflecting signal S2 is smaller than or equal to a predefined value, the turntable watch 10 is represented as being located in the environment with the over-bright ambient illumination, and an identifying result of the pointers 20 is affected by the over-bright ambient illumination; the optical detection device 16 may not execute the function of detecting and calibrating the pointers 20.

If the difference between the physical quantity of the first optical reflecting signal S2 and the second optical reflecting signal S2 is greater than the predefined value, the turntable watch 10 is represented as being located in the environment without the over-bright ambient illumination, such as in the night or in an indoor place, so that the identifying result of the pointers 20 is not affected by the ambient illumination, and the optical detection device 16 can execute the function of detecting and calibrating the pointers 20. The optical detecting signal S1 and the optical reflecting signal S2 may be infrared rays, and the light penetrating unit filled inside the hole 36 can be an infrared filter. Thus, the predefined value can be set by referring to a property of the light penetrating unit and/or an imaging ability of the optical receiver 26 affected by the ambient illumination.

The turntable watch 10 of the present invention can provide a function of identifying whether an active object (such as a user's finger) is moved above the optical detection device 16. The processor 28 can utilize the motor 30 to shift the pointer 20 forward and backward for moving across the optical receiver 26 twice, and then respectively acquire the first optical reflecting signal S2 and the second optical reflecting signal S2 at different time. The physical quantity of the first optical reflecting signal S2 and the second optical reflecting signal S2 should both conform to the predefined condition if there is not active object located above the optical detection device 16. If at least one of the physical quantity of the first optical reflecting signal S2 and the second optical reflecting signal S2 does not conform to the predefined condition, the active object can be represented as staying above the optical detection device 16, so that the first optical reflecting signal and the second optical reflecting signal can be aborted.

Moreover, time difference between the first optical reflecting signal S2 and the second optical reflecting signal S2 can be another predefined value stored in the memory 34 of the optical detection device 16. For example, the turntable watch 10 can set the predefined value as five seconds, which depends on a user's habit. If the time difference is shorter than five seconds, the optical detection device 16 may not distinguish the active object from the pointers 20 because the active object may be temporarily located above the optical receiver 26 in a short time. If the time difference is equal to or greater than five seconds, the active object does not stay above the optical detection device 16 for such a long period of time, and accordingly the processor 28 can identify the first optical reflecting signal S2 and the second optical reflecting signal S2 are generated by the pointers 20. In this embodiment, the predefined condition can be represented as the physical quantity greater than or smaller than the predefined threshold in response to a coefficient of the reflectivity material coated on the pointers 20.

The turntable watch 10 of the present invention can provide a function of identifying whether an inactive object (such as cloth) is located above the optical detection device 16. The processor 28 can count a remaining period of the physical quantity of the optical reflecting signal S2 conforming to the predetermined condition. If the remaining period is greater than a predefined period stored in the memory 34 of the optical detection device 26, the optical reflecting signal S2 can be represented as being generated by the inactive object; for example, the turntable watch 10 is put inside a pocket of the cloth, and the optical reflecting signal S2 can be aborted accordingly. If the remaining period is not greater than the predefined period, the optical reflecting signal S2 may be generated by the pointers 20 or the active object, so the optical reflecting signal S2 can be useful and further analyzed again for identifying it belongs to the pointers 20 or the active object.

Figure 5:
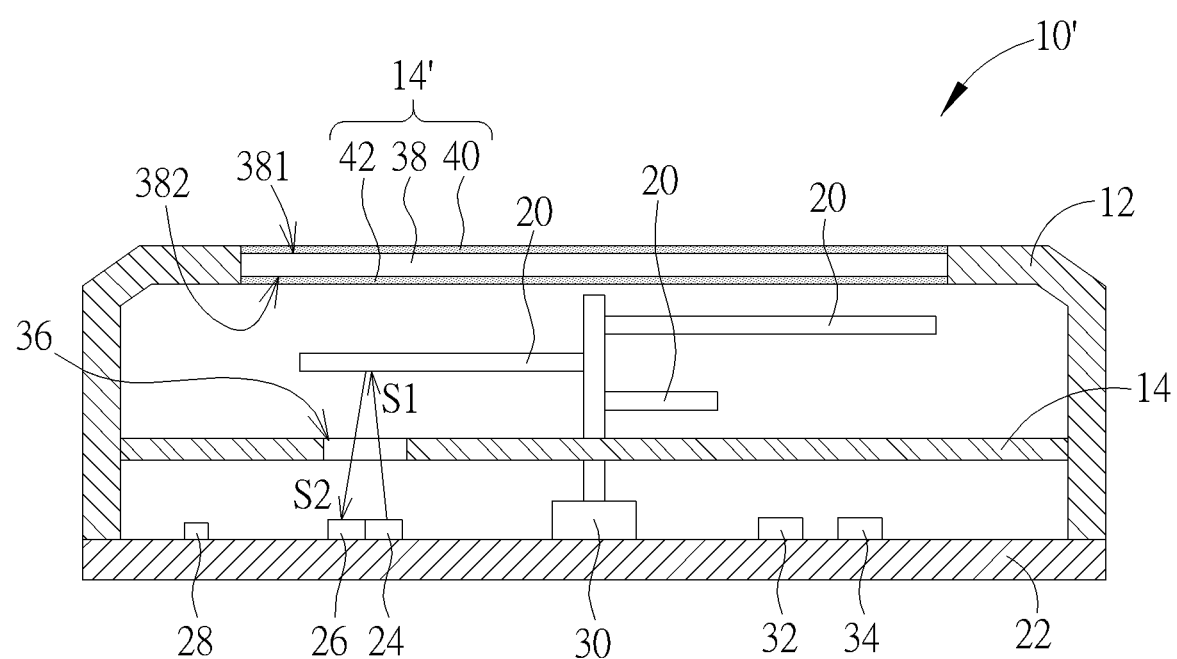
FIG. 5 is a section view of the turntable watch according to another embodiment of the present invention.

Please refer to FIG. 5. FIG. 5 is a section view of the turntable watch 10' according to another embodiment of the present invention. In this embodiment, elements having the same numerals as ones of the above-mentioned embodiment have the same structures and functions, and a detailed description is omitted herein for simplicity. The covering component 14' of the turntable watch 10' can include a transparent body 38 and a light rejecting layer 40. The light rejecting layer 40 can be disposed on a first surface 381 of the transparent body 38 to face the outside of the casing 12. The optical emitter 24 can emit the optical detecting signal S1 with a specific wavelength, and the optical receiver 26 can receive the optical reflecting signal S2 with the specific wavelength.

The light rejecting layer 40 can provide a function of rejecting an ambient optical signal with the specific wavelength, that is to say, the optical reflecting signal S2 received by the optical receiver 26 is generated by reflection of the optical detecting signal S1, which means the light rejecting layer 40 is a filter for excluding an ambient optical signal with the specific wavelength from entering the casing 12. The light rejecting layer 40 can filter noise from the ambient optical signal, so that the optical reflecting signal S2 received by the optical receiver 26 comes from reflection of the pointers 20, and the processor 28 can analyze the optical reflecting signal S2 to determine whether the pointers 20 are located above the optical receiver 26 without environmental interference.

In another possible situation, the covering component 14' can further include a light absorbing layer 42, which can be disposed on a second surface 382 of the transparent body 38 opposite to the first surface 381. The light absorbing layer 42 can be used to absorb the optical detecting signal S1 and the optical reflecting signal S2 with the specific wavelength. Thus, the optical detecting signal S1 not projected onto the pointers 20 can be absorbed by the light absorbing layer 42, which means the optical reflecting signal S2 received by the optical receiver 26 can be all generated from the optical detecting signal S1 reflected by the pointers 20. Design of the light absorbing layer 42 can be used to decrease noise from reflection of the casing 12 and the covering component 14.

The optical detection device of the present invention can be suitable for any kind of the turntable watch without altering inner mechanical structure of the turntable watch. The optical detection device can be disposed on one surface of the casing, and a thickness of the turntable watch can be decreased accordingly. The holder inside the casing can be made by transparent material or bore the hole for allowing passing of the optical detecting signal and the optical reflecting signal, so that the turntable watch can provide preferred artistic appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detection device of detecting a pointer position of a turntable watch, the optical detection device comprising:
   an optical receiver disposed on a substrate distant from a holder with a plurality of pointers of the turntable watch and adapted to receive an optical reflecting signal passing through the holder; and a processor electrically connected to the optical receiver and adapted to compare a physical quantity of the optical reflecting signal with several predefined conditions for determining whether one of the plurality of pointers is located above the optical receiver and distinguishing one pointer from another pointer via the optical reflecting signal received by the same optical receiver.

2. The optical detection device of claim 1, further comprising:
an optical emitter electrically connected to the processor and adapted to emit an optical detecting signal, wherein the optical detecting signal is projected onto the pointer to generate the optical reflecting signal.

3. The optical detection device of claim 1, wherein the processor is electrically connected to a motor and a time receiver of the turntable watch, the processor is used to drive the motor to calibrate the pointer in accordance with a comparison result of the physical quantity and a time signal received by the time receiver.

4. The optical detection device of claim 1, wherein the optical detection device further comprises a memory electrically connected to the processor and used to store a predefined threshold, the processor compares the physical quantity with the predefined threshold to determine whether the physical quantity conforms to the predetermined condition.

5. The optical detection device of claim 4, wherein the predefined condition is represented as the physical quantity greater than the predefined threshold in response to the pointer coated by high reflectivity material.

6. The optical detection device of claim 4, wherein the predefined condition is represented as the physical quantity smaller than or equal to the predefined threshold in response to the pointer coated by low reflectivity material.

7. The optical detection device of claim 1, wherein the physical quantity is illumination of the optical reflecting signal, and the illumination is computed according to intensity values detected by at least some of the pixels of the optical receiver.

8. The optical detection device of claim 1, wherein the processor sets a first acquired result from a plurality of comparison results as a reference for calibrating the pointer when acquiring the plurality of comparison results conforming to the predefined condition.

9. The optical detection device of claim 1, wherein the turntable watch has a first pointer and a second pointer, the processor compares the physical quantity with a first predefined condition and a second predefined condition to determine the optical reflecting signal belonging to the first pointer or the second pointer.

10. The optical detection device of claim 9, wherein the first predefined condition and the second predefined condition are intensity range or a remaining period of specific intensity.

11. The optical detection device of claim 9, wherein the processor is electrically connected to a motor of the turntable watch, and used to respectively or simultaneously depart the first pointer and the second pointer from a position located above the optical receiver via the motor for initialization.

12. The optical detection device of claim 1, wherein the optical receiver is exposed via a hole formed on a holder of the turntable watch, or is disposed under a light penetrating unit filled inside the hole of the holder.

13. An optical detection device of detecting a pointer position of a turntable watch, the optical detection device comprising:
an optical emitter adapted to emit an optical detecting signal;
an optical receiver disposed on a substrate distant from a holder with a plurality of pointers of the turntable watch and adapted to receive an optical reflecting signal passing through the holder, wherein the optical detecting signal is projected onto one of the pointers to generate the optical reflecting signal; and
a processor electrically connected to the optical emitter and the optical receiver, and adapted to compare variation in physical quantity of several optical reflecting signals respectively received at different time with several predefined conditions for identifying the optical reflecting signals are aborted or used to determine the pointer is located above the optical receiver and distinguish one pointer from another pointer via the optical reflecting signals received by the same optical receiver.

14. The optical detection device of claim 13, wherein the processor turns off the optical emitter to acquire a first optical reflecting signal and then turns on the optical emitter to acquire a second optical reflecting, and analyzes difference between the physical quantity of the first optical reflecting signal and the second optical reflecting signal for deciding whether an identifying result of the pointer is affected by ambient illumination.

15. The optical detection device of claim 14, wherein the identifying result is affected by the ambient illumination when the physical quantity difference is smaller than or equal to a predefined value, and the identifying result is not affected by the ambient illumination when the physical quantity difference is greater than the predefined value.

16. The optical detection device of claim 13, wherein the processor is electrically connected a motor of the turntable watch, the processor shifts the pointer forward and backward via the motor to respectively acquire a first optical reflecting signal and a second optical reflecting signal, and analyzes physical quantity of the first optical reflecting signal and the second optical reflecting signal to identify the optical reflecting signals are aborted or useful.

17. The optical detection device of claim 16, wherein the first optical reflecting signal and the second optical reflecting signal are aborted when at least one of the physical quantity of the first optical reflecting signal and the second optical reflecting signal does not conform to a predefined condition.

18. The optical detection device of claim 17, wherein the predefined condition is represented as the physical quantity greater than or smaller than a predefined threshold in response to a coefficient of reflectivity material coated on the pointer.

19. The optical detection device of claim 16, wherein time difference between the first optical reflecting signal and the second optical reflecting signal is a predefined value stored in a memory of the optical detection device.

20. The optical detection device of claim 13, wherein the processor counts a remaining period of the physical quantity conforming to a predetermined condition, and analyzes the remaining period to identify whether the optical reflecting signals are aborted or useful.

21. The optical detection device of claim 20, wherein the processor determines the optical reflecting signals are aborted when the remaining period is greater than a predefined period stored in a memory of the optical detection device.

22. A turntable watch, comprising:
a casing where inside a substrate, a plurality of pointers and a holder are disposed, the substrate being distant from the holder, the pointers being movably disposed on the holder;
a covering component disposed on the casing and adapted to cover the pointers, the covering component comprising:
   a transparent body; and
   a light rejecting layer disposed on a first surface of the transparent body to face the outside of the casing for rejecting an ambient optical signal with a specific wavelength; and
an optical detection device of detecting position of the pointers, the optical detection device comprising:
   an optical emitter adapted to emit an optical detecting signal with the specific wavelength;
   an optical receiver disposed on the substrate and adapted to receive an optical reflecting signal passing through the holder, wherein the optical detecting signal is projected onto one of the pointers to generate the optical reflecting signal; and
   a processor electrically connected to the optical receiver, and adapted to compare the optical reflecting signal with several predefined conditions for determining whether the pointer is located above the optical receiver and distinguish one pointer from another pointer via the optical reflecting signals received by the same optical receiver.

23. The turntable watch of claim 22, wherein the covering component further comprises a light absorbing layer disposed on a second surface of the transparent body opposite to the first surface, and adapted to absorb the optical detecting signal and the optical reflecting signal with the specific wavelength.

24. The turntable watch of claim 22, wherein the processor determines the pointer is located above the optical receiver when physical quantity of the optical reflecting signal conforms to a predetermined condition.

25. The turntable watch of claim 24, wherein the processor determines the optical reflecting signal conforms to the predetermined condition in response to the physical quantity greater than a predefined threshold when the pointer is coated by high reflectivity material.

26. The turntable watch of claim 24, wherein the processor determines the optical reflecting signal conforms to the predetermined condition in response to the physical quantity smaller than or equal to a predefined threshold when the pointer is coated by low reflectivity material.

27. The turntable watch of claim 22, wherein the holder has a hole aligning with the optical receiver, and the hole is hollow or filled by a light penetrating unit.

* * * * *